Dec. 27, 1938. T. H. KRUEGER Re. 20,955
TAPE SERVING MACHINE
Original Filed Aug. 9, 1927 3 Sheets-Sheet 1
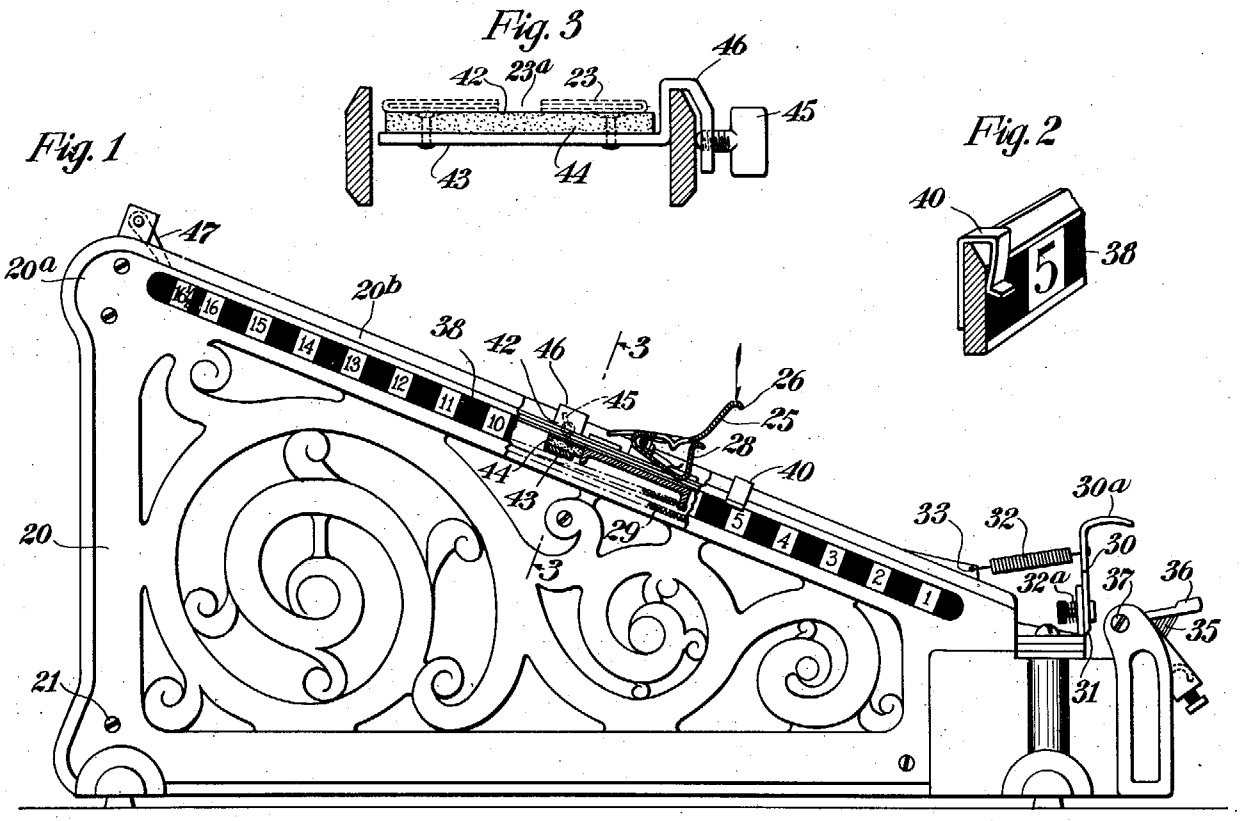
INVENTOR
Theodore H. Krueger,
By Raymond & Littell
ATTORNEYS Dec. 27, 1938. T. H. KRUEGER Re. 20,955
TAPE SERVING MACHINE
Original Filed Aug. 9, 1927 3 Sheets-Sheet 2
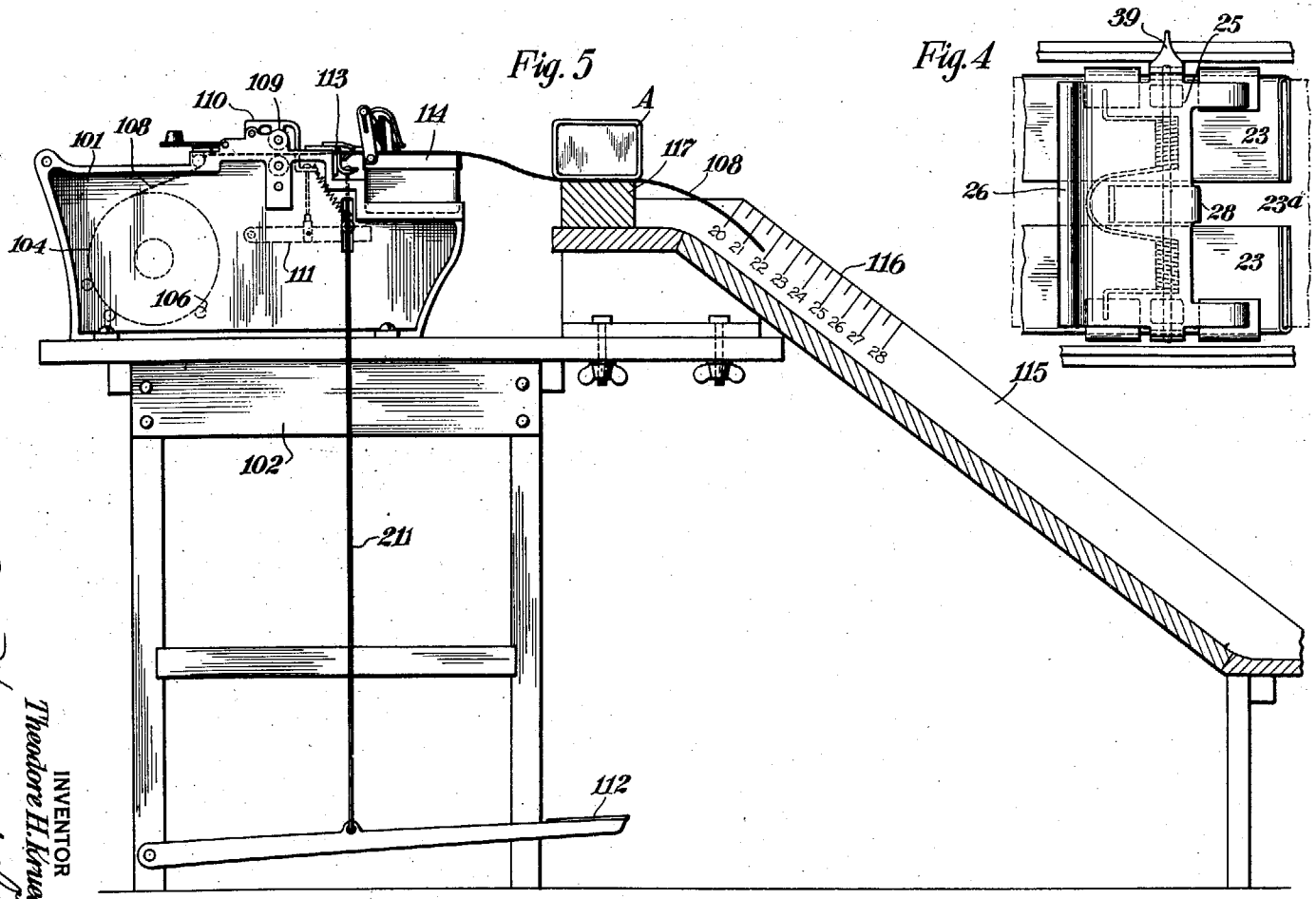
INVENTOR
Theodore H. Krueger,
By Hammond & Littell
ATTORNEYS Dec. 27, 1938. T. H. KRUEGER Re. 20,955
TAPE SERVING MACHINE
Original Filed Aug. 9, 1927 3 Sheets-Sheet 3
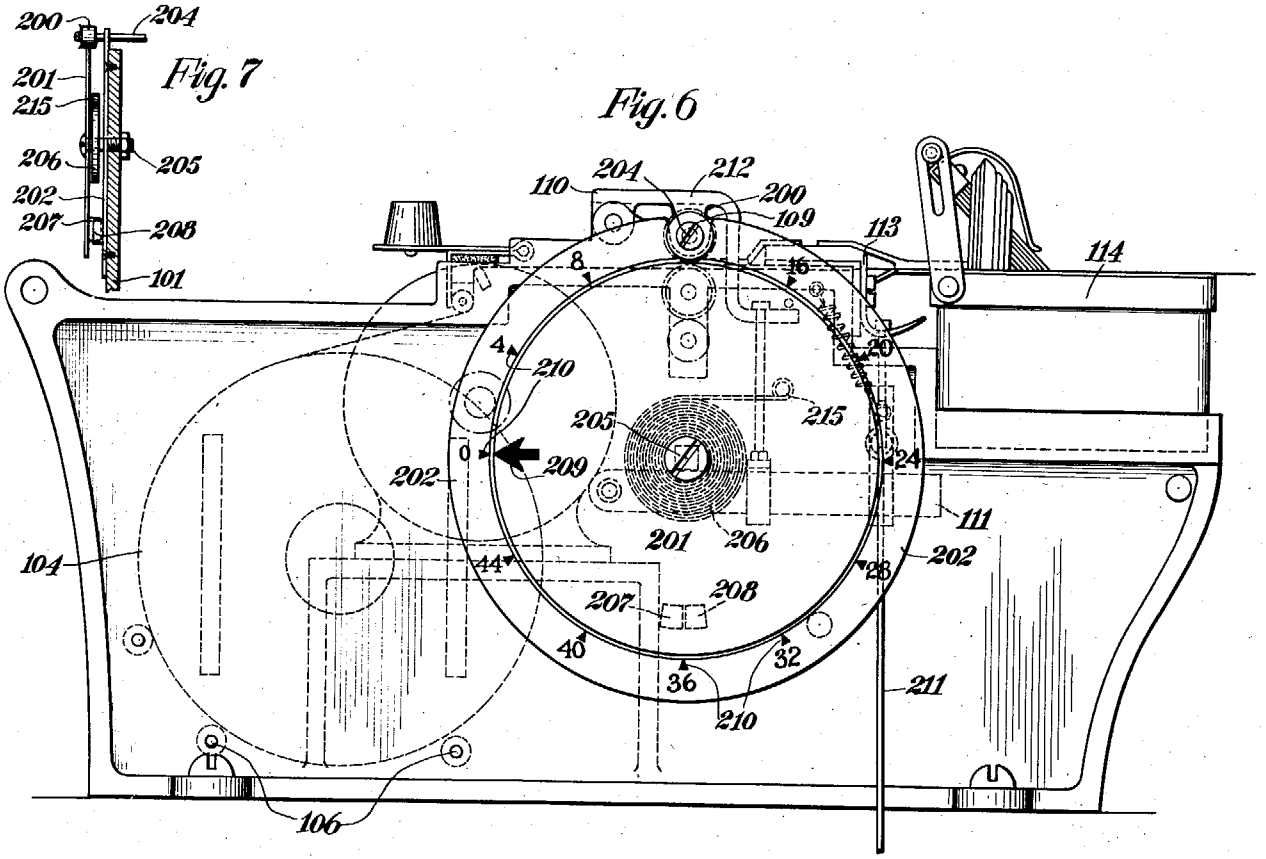
INVENTOR
Theodore H. Krueger,
By Hammond & Littell
ATTORNEYS Reissued Dec. 27, 1938

Re. 20,955

UNITED STATES PATENT OFFICE 20,955

TAPE SERVING MACHINE

Theodore H. Krueger, Stratford, Conn., assignor to Better Packages Inc., New York, N. Y., a corporation of New York Original No. 1,742,603, dated January 7, 1930, Serial No. 211,662, August 9, 1927. Application for reissue June 5, 1931, Serial No. 542,442

2 Claims. (Cl. 91—14.5)

This invention relates to paper serving machines and more especially to machines for serving and moistening gummed paper strips to be immediately applied to a package or the like. This application is a continuation in part of my copending application Serial No. 696,907, filed March 4, 1924.

It is the object of the invention to provide a visual indicator for strip serving machines which will show the operator thereof how much tape has been fed past the cutting knife at any moment during the feeding interval to permit the feeding to be stopped at any desired length.

Another object of this invention is to provide an indicating means on and in conjunction with a strip serving machine which will accurately and readily indicate the amount of gummed strip fed and to permit the same length of piece to be furnished repeatedly without difficulty or guesswork on the part of the operator.

It is another object of this invention to provide, in a machine adapted to serve strips of tape, a suitable visual indicator to facilitate the service of uniform or desired lengths of tape.

It is another object of this invention to provide an indicator for gummed strip serving machines in combination with a cut off mechanism which may be set at some definite point on the indicator scale to permit uniform lengths of strip to be cut and discharged automatically.

Still another object of the invention is to provide an indicating mechanism in synchronism with the tape feeding device to show how much tape has been fed so that the operator may stop the machine before the automatic device operates if shorter strips are required.

A further object of the invention is to provide a machine of this type having a feeding device to feed and discharge tape and a length indicator to show the length of strip fed which is actuated and synchronized with this feeding device.

It is also an object of this invention to provide a serving device from which complicated mechanism has been eliminated with a resulting increase in convenience and simplicity of its use, to provide a device of such size and especially as to be capable of most convenient location and of use without involving any unnatural movements on the part of the operator, necessary with previous devices, and which is provided with a visual tape feeding indicator.

Further objects and advantages of this invention will appear from the following detailed description together with the attached drawings of preferred forms of embodiment thereof and in which,—

Fig. 1 is a side view of the tape serving machine with parts broken away to show one form of embodiment of my invention.

Fig. 2 is a perspective view of a central portion of the indicator shown in Fig. 1.

Fig. 3 is a vertical section through the upper face of the machine on the line 3—3 of Fig. 1.

Fig. 4 is a plan view of the tape feeding carriage.

Fig. 5 is a side elevation of a modified form of the device.

Fig. 6 is an enlarged side elevation of a still further modified form of the device.

Fig. 7 is a sectional view of the measuring mechanism illustrated in Fig. 6.

In the embodiment of the invention illustrated in Figures 1 to 4, inclusive, the machine comprises a pair of substantially triangular shaped side frame members 20 connected by cross members 21 and spaced apart a sufficient distance to receive tape serving mechanism and tape roll therebetween, as is more clearly shown in my copending application above mentioned. The roll of gummed paper strip is adapted to be unwound and threaded over the top portion 20*a* of the machine and will project through a suitable guide 23 along the tape face 20*b* of the machine. The strip feeder 25 is provided with a finger piece 26 and a downwardly projecting strip gripping means 28 which will suitably grip the strip through a slot 23*a* in the guide 23 when the feeder is manually depressed. This strip feeder slides loosely on the guide 23 along the top face of the machine to permit feeding of the tape therethrough. When the fingers are removed from the finger piece 26, a suitable spring releases the gripper jaw 28, so that the feeder may be returned to its starting point preparatory to feeding a new strip. The coil spring 29 is secured at one end of the feeder and to a point on the machine frame to automatically return the feeder to its topmost position.

The cutter 30, similarly described in my copending application, comprises a finger pressure plate 30*a* and an upper blade 30 and a lower blade 31. The coil spring 32 is attached to the blade 30 at one end and to the frame at the other to hold the cutter firmly against the shear plate to permit a more clean cut of strips, and the coil spring 32*a* raises the blade 30 after it has been depressed.

A moistener is provided adjacent the cutter at the end of the machine to engage the strip after it passes the cutter. It comprises a liquid container arranged to lie between the frames 20 and to be supported thereby. This moistener is provided with a brush 35, a weighted metal pressure plate 36 above the brush to force the gummed strip into close contact with the brush for thoroughly moistening the strip. This is all previously described in my copending application and is only disclosed in a general way in this application.

The tape indicator to measure the length of strip, the feature of this invention, comprises a scale 38 and a pointer 39 on the strip feeder 25 by which the scale may be read.

Suitable markers 40 may be provided to frictionally engage the scale portion to mark any desired length of strip and where the package being wrapped necessitates strips of different lengths, marks of different color may be applied to the scale 38 to assist the operator to return the strip feeder to the proper point to feed out the desired length. For automatically stopping the return of the feeder 25 in position to feed out a fixed length of strip which is less than the length of the guide 23 a stop 42 is provided comprising a base portion 43 supporting a cushion pad 44 against which the feeder 25 strikes to stop the return movement of the feeder. To adjust the position of the stop, the thumb screw 45 in the hook portion 46 may be loosened and the stop mechanism slid to the desired position and secured by tightening the thumb screw.

To prevent the paper strip from being fed back when the feeder 25 is returned from the lower position of its movement the pawl 47 is provided near the top of the machine which presses against the upper end portion of the guide in such a way as to permit the paper strip to move in one direction only.

The operation of the device will thus be apparent. The operator grasps the finger portion of the strip feeding mechanism, presses it downward toward the gummed strip, and by pulling the strip feeding mechanism toward the front of the machine, the gummed strip is forced past the moistening means and emerges in a condition immediately usable. When the desired length has been fed out the feeder 25 will be released, the cutter arm will be depressed, and the moistened strip removed to be fixed to a package. By noting the movement of the indicating pointer 39 along the scale 38, the amount of tape fed out can be accurately measured and can be varied at will independent of the adjustment of the stop 42.

In the modification shown in Figures 5, 6 and 7, an electrically driven strip feeding mechanism is shown similar to that of my copending application Serial No. 40,495, filed June 30, 1925, in which the side frames 101 of the machine are supported on a raised table 102 and between which a roll of gummed tape 104 is adapted to be held. The roll of tape is shown in dotted lines suitably supported on cross members 106 and the tape also shown in dotted lines at 108 passes between rollers 109, the lower one of which is preferably continuously driven from a motor (not shown). The upper roll is journaled in an arm 110 and suitably connected by a link to another arm 111 which, upon being depressed, will draw the upper of the two rolls 109 into contact with the lower constantly rotating roll, and as the gummed strip 108 passes therethrough will frictionally engage said tape and force it to discharge through the machine. A foot treadle 112 and link 211 is provided for depressing the arm 111 which controls the feeding of the strip. The foot treadle 112 is also made to actuate a cutting means 113 which, upon being released due to the removal of the operator's foot from the treadle, will move the cutter to cut the strip 108. Moistening means 114 similar to the theretofore described means is provided for moistening the strip.

In cooperation with the strip feeding mechanism is a strip guide and feeding length indicator as shown in which a channel 115 provided with an appropriate scale 116 is adapted to measure the quantity of tape 108 fed from the machine. Block 117 is adapted to receive a package A. When the proper amount of strip has been fed out and when the operator's foot is removed from the treadle 112, the tape will be of the proper length to adequately wrap the package A as so predetermined by the amount of strip feed along the scale 116. By noting the movement of the end of the strip 116, any desired length may be accurately measured.

In the modified form of measuring device illustrated in Figs. 6 and 7, the lower of the rollers 109 is constantly driven and the feeding of the tape is started by lowering the upper roller as previously described.

Fixed rigidly to one of the side frames 101 is a round scale plate 202 graduated by spaced markers 210 suitably numbered. A stud 205 protrudes out from the frame 101 and supports a disc 201 freely rotating within the fixed scale plate 202.

A friction roller 200 mounted on the shaft 204 of the upper feed roller 109 comes into contact with the periphery of the disc 201 at the moment when the tape begins to be fed forward moving the disc 201 relative to the scale 202 and in synchrony with the feeding of the tape so that the arrow 209 on the disc will indicate the amount of tape fed out at any time.

A clock spring 206 is secured to the inner face of the disc 201 by the stud 215 and at the other end to the stud shaft 205 so that when the roller 200 is released, the disc 201 will be returned to its zero position. The stops 207 and 208 serve to locate the normal position of the disc.

Thus, when the operator depresses the treadle 112, he simultaneously starts the feeding of the tape and the movement of the disc 201, the two moving in synchrony so that by observing the arrow 209, the operator can at any time tell the amount of tape fed out. As soon as the feeding of the tape is stopped, the arrow 209 is returned to zero position.

It will be understood that various means may be provided for measuring the length of tape fed out by a tape serving machine and that it is the spirit and purpose of this invention to provide an automatic means whereby the operator may determine at any time independent of any fixed gauges the amount of tape fed out and that the embodiment shown herein is illustrative only.

What I claim is:

1. A strip serving machine of the type described comprising a supply of gummed strip, a strip moistening means, a strip severing means and a continuously movable strip feeding means normally inoperative to move the strip, means to cause said feeding means to engage the strip to feed the same from the machine, and visual means for measuring the length of strip fed from the machine.

2. In a strip serving machine of the type described a supply of gummed strip, a strip moistening means, a strip severing means and a strip feeding means adapted to engage a strip to feed it from the machine, said means comprising a continuously rotatable roller normally out of positive engagement with the strip and a pedal operated means for causing said roller to engage the strip and feed the same from the machine, a visual indicating means for measuring the length of strip fed out, said severing means being operated by said pedal to sever the strip when a visually calculated predetermined length of the strip has been fed out.

THEODORE H. KRUEGER.